United States Patent Office 3,384,185
Patented May 21, 1968

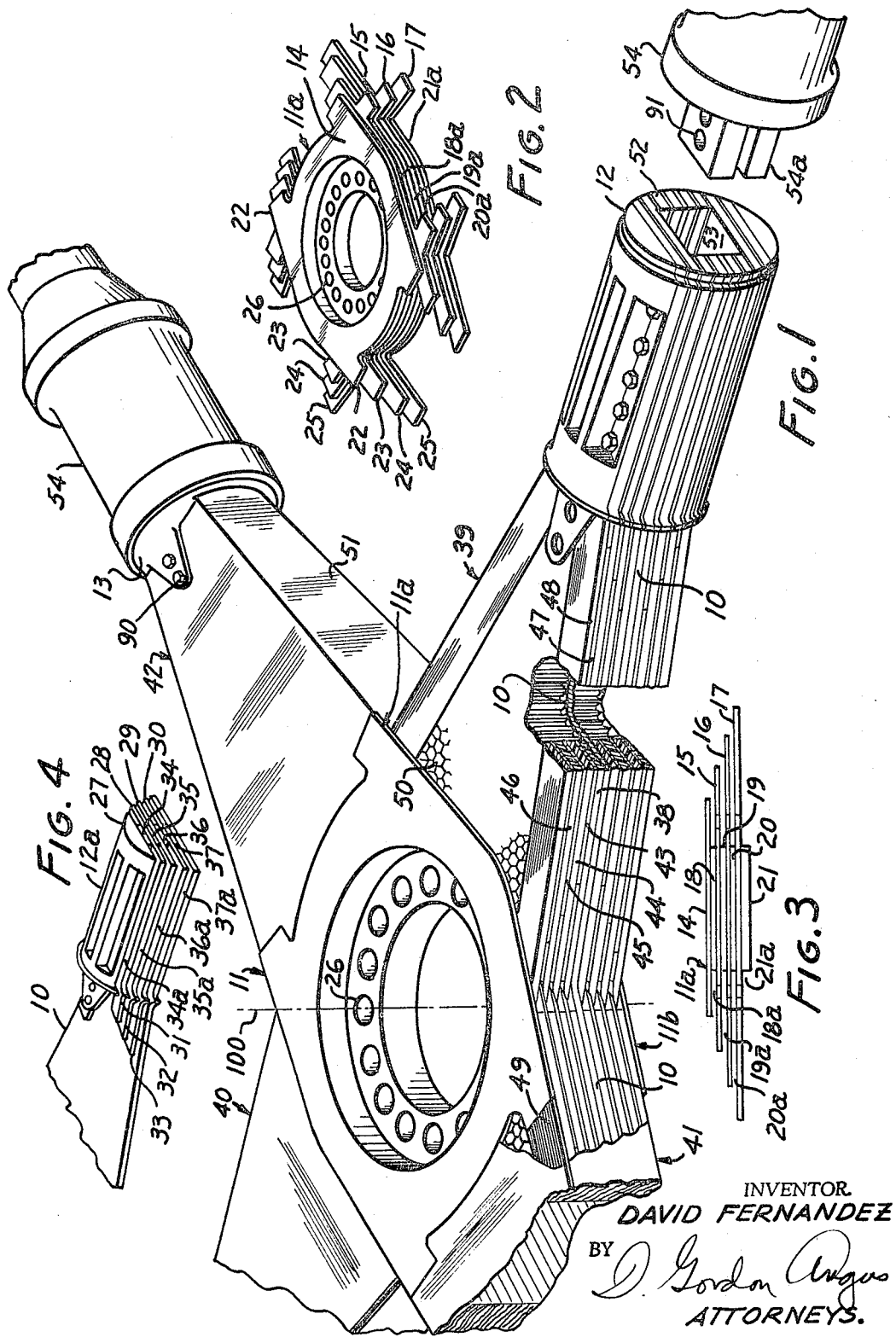

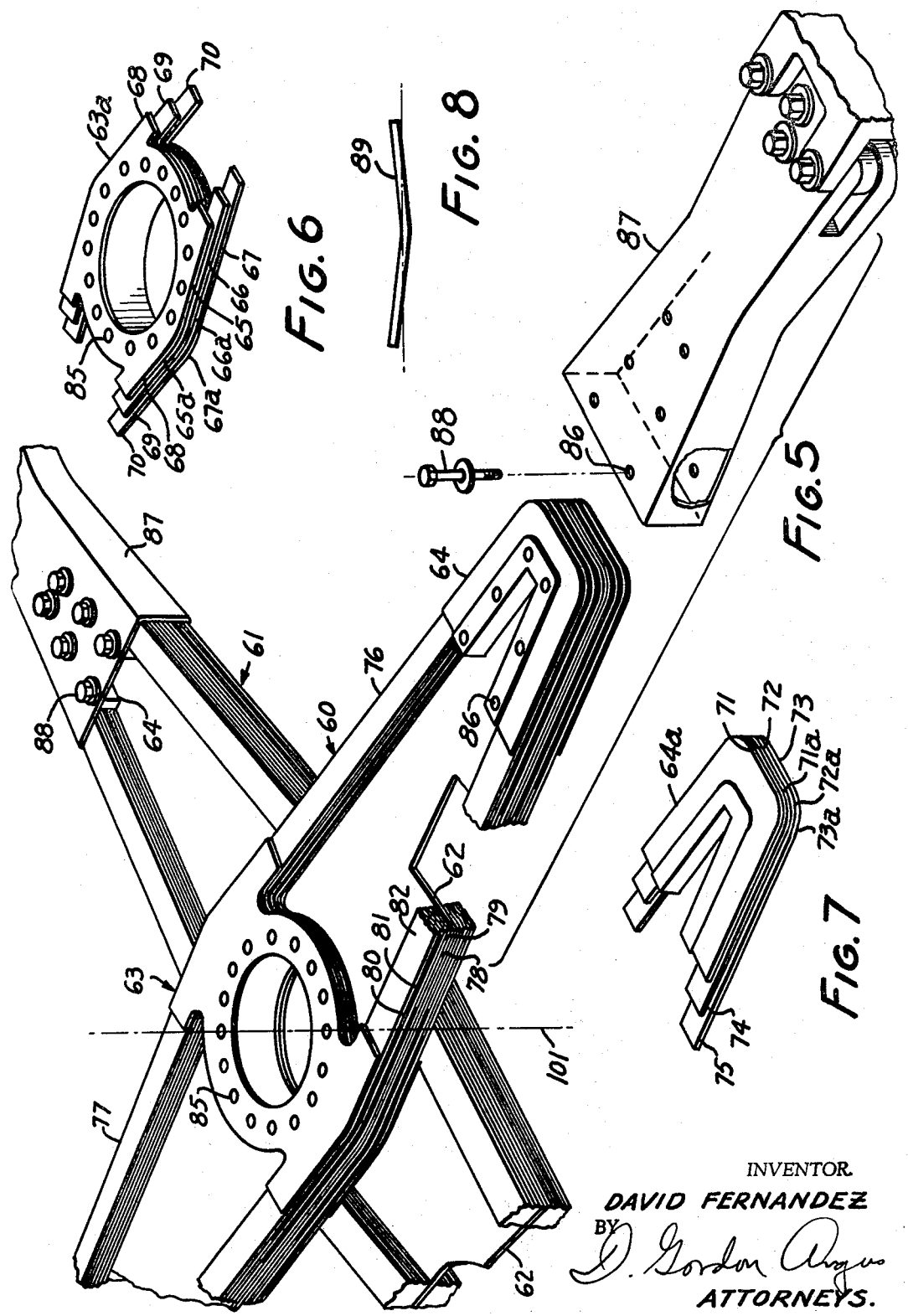

3,384,185
ROTOR HUBS
David Fernandez, Arcadia, Calif., assignor to Aerojet-General Corporation, El Monte, Calif., a corporation of Ohio
Filed June 2, 1967, Ser. No. 643,169
20 Claims. (Cl. 170—160.53)

ABSTRACT OF THE DISCLOSURE

This disclosure relates to rotor hubs, and particularly to interlaminated rotor hubs for use on aircraft, such as helicopters and the like.

An interlaminated rotor hub according to this disclosure includes a hub plate having a plurality of extending arms. A grooved attachment means is provided at the inboard portion of each arm and is adapted to be attached to a rotatable shaft, such as the shaft of a helicopter motor. A grooved blade cuff is provided at the outboard end of each arm, and a layer of filament rovings is wound through the grooves of both the blade cuff and the attachment means to form the periphery of the rotor hub. This arrangement permits elimination of the drag and flapping bearings, heretofore known in helicopter rotor hubs.

In one embodiment of the disclosure, some layers of filament rovings are separated with an elastomer to permit elimination of the pitch bearing. In another embodiment, the layers of filament rovings are separated with filler layers of filament material, and the area with the periphery defined by the filament rovings is filled with a honeycomb filler.

---

This invention relates to rotor hubs and particularly to interlaminated rotor hubs for use on aircraft such as helicopters and the like.

In order to provide an effective rotor hub for a high speed helicopter, for example, a helicopter capable of traveling at an air speed of 300 m.p.h., provision must be made to absorb strain in the pitch plane, the lead-lag or drag plane, and the flap plane of the rotor blade.

Ordinarily, the blade tip speed for a helicopter is of the order of about 900 feet/second in still air. When a helicopter is traveling at an air speed of 300 m.p.h., the speed of a blade tip moving forward is increased by 300 m.p.h., while the speed of a blade tip moving rearward is decreased by 300 m.p.h. Thus, at 300 m.p.h., the speed of travel of a blade tip varies about 600 m.p.h. between approximately 700 and 1100 feet/second during each revolution. In such a case, the blade tip typically must cycle between 700 feet/second and 1100 feet/second about 15 times per second. The fatigue load thus imposed on the bearings is at a cyclic rate more severe than known in slower craft, thus causing bearing wear and necessitating replacement at frequent intervals.

It is an object of the present invention to provide a rotor hub capable of torsional flexure, as well as flexure in the flap and drag planes, in order to eliminate pitch bearings.

Another object of the present invention is to provide an interlaminated rotor hub having portions constructed of filament rovings so as to reduce the weight of the rotor hub over those previously known.

An optional and desirable feature of the present invention is to provide an interlaminated rotor hub having portions constructed of filament rovings and portions constructed of elastomer so as to allow the rotor hub to flex in the flapping, drag and pitch planes, thereby eliminating the need for flapping, drag and pitch bearings, and thereby reducing the weight of the rotor hub over those previously known.

An interlaminated rotor hub according to this invention comprises a hub plate having a plurality of extending arms. Attachment means is provided at the inboard portion of each arm and is adapted to be rotated about an axis such as by a shaft of a helicopter motor. A blade cuff is provided at the outboard end of each arm, and a layer of filament rovings is supported by both the blade cuff and the attachment means to form the periphery of the rotor hub.

According to an optional but desirable feature of this invention, each layer of filament rovings is separated with a layer of filament roving filler material, and the arms of the rotor hub are filled with a honeycomb filler and covered with a skin.

According to another optional but desirable feature of this invention, some layers of filament rovings are separated with an elastomer to provide pitch plane flexing.

The above and other features of this invention will be fully understood from the following detailed description and the accompanying drawings, in which:

FIG. 1 is a perspective view partly in cutaway cross-section of the presently preferred rotor hub according to the present invention;

FIG. 2 is a perspective view of a portion of an attachment means for use in the rotor hub illustrated in FIG. 1;

FIG. 3 is a side view elevation of the attachment means looking from line 3—3 in FIG. 2;

FIG. 4 is a perspective view of a portion of a blade cuff for use in the rotor hub illustrated in FIG. 1;

FIG. 5 is a perspective view partly in cutaway cross-section of a modification of the rotor hub illustrated in FIG. 1;

FIG. 6 is a perspective view of a portion of an attachment means for use in the rotor hub illustrated in FIG. 5;

FIG. 7 is a perspective view of a portion of a blade cuff for use in the rotor hub illustrated in FIG. 5; and FIG. 8 is a side view elevation of a rotor hub according to the present invention;

Refering to FIGS. 1–4 there is illustrated a central hub plate 10 having arms in the general configuration of a rotor hub. Preferably, the hub plate is constructed from high-strength carbon-steel wire rovings, aligned to provide in-plane stiffness for the rotor hub as explained hereinafter. Hub attachment means 11 is attached to the inboard end of hub plate 10. The outboard end of each arm of hub plate 10 supports blade cuffs 12 and 13. It is to be understood that a blade cuff is supported at the outboard end of each arm, and that each blade cuff is similar in design and manufacture.

Hub attachment means 11 comprises two identical attachment members 11a and 11b, member 11a being shown in greater detail in FIGS. 2 and 3. The hub attachment portion 11a comprises a plurality of parallel sheet-like portions 14–17 spaced apart by washer-like portions 18–21 to form grooves 18a–21a. Portion 14 has a plurality of tongues 22 extending in the outboard direction along the edge of each of a pair of opposite arms 41 and 42 of the rotor. Portions 15–17 are likewise provided with tongues 23–25, each of successively increasing length and each extending along the edge of each arm 39–42. Grooves 18a–20a are disposed between successive portions 14–17, and groove 21a is formed between portion 17 and hub plate 10 when attachment member 11a is assembled to the hub plate.

Member 11a may be constructed by continuously winding adhesive-impregnated steel rovings on a drum-shaped mandrel (not shown), to form a tubular article (not shown) which, after curing the adhesive, is a solid member which may be machined to the configuration shown in FIG. 2.

Another method for constructing member 11a is to provide a mold having portions conforming to the central mounting portions of a helicopter motor shaft on the inside, and portions approximately conforming to the grooves and portions of the member 11a on the outside. Random steel rovings may then be placed in the mold with a suitable bonding adhesive and the device may be cured. The device may then be machined to the shape shown in FIG. 2.

One type of steel roving suitable for either method of construction is a high strength carbon steel roving having a diameter of 0.0035 inch and a tensile strength of 600,000 p.s.i., commercially available from National Standard Company of Niles, Mich., under the trade name "Rocket Wire." The steel rovings are bonded together with a suitable adhesive such as an epoxy resin, available from Shell Chemical Company of Los Angeles, Calif., under the trade name "Shell Epon." The resin is cured by subjecting the structure to heat for a sufficient length of time to cure the resin. Thermosetting resins which are curable by other chemical or physical means, such as by radiation or by curing catalysts, may be used, if desired. As one example, the uncured structure may be heated to 250–300° F. for a period of about 4–6 hours to obtain a complete cure. The temperature and length of time necessary to obtain a complete cure is dependent upon the size of the steel rovings and the type of resin used.

Member 11a illustrated in FIGS. 2 and 3 is finally shaped by machining the portions 14–17 and tongues to a desired size and shape and by machining suitable mounting holes 26 into the center of the member for mounting the completed rotor hub to a rotor shaft with bolts or other suitable mounting means (not shown). Axis 100 of the attachment means 11 is aligned with the axis of the motor shaft when mounted to the shaft.

Members 12a may be constructed in a manner similar to attachment member 11a by continuously winding steel rovings over a spindle to form a solid cylindrical member, and machining the cured product to form parallel sheet-like portions 27–30 spaced apart by spacer-like portions 34–37 to form grooves 34a–36a between successive portions 27–30, and groove 37a between portion 30 and hub plate 10 when the member 12a is assembled to the hub plate. Another method for constructing blade cuff member 12a is to provide a suitable mold having portions conforming to the sheet-like portions and spacer-like portions and filling the mold with resin-impregnated random steel rovings which, after curing, form a "rough" product which may be machined to the shape shown in FIG. 4. It is preferable, although not necessary, to provide grooves 34a–37a around the sides and outboard end of member 11a so that the grooves are formed on that end also to further aid in winding filament rovings in a later operation. The grooves will serve as a mandrel for winding filament rovings, and the end of the blade cuffs may thereafter be machined off to a clean surface.

Portions 28–30 have extended tongues 31–33 of successively increasing lengths extending in the inboard direction above the sides of hub plate 10.

After completion of the hub attachment portion and blade cuff portions, a pair of completed hub attachment members 11a and 11b are mounted on opposite sides of hub plate 10 at the inboard of the hub plate, so as to sandwich the hub plate therebetween. Washer-like portion 21 of each attachment member abuts one surface of hub plate 10. Likewise, blade cuff members 12a are mounted on opposite sides of hub plate 10 at the outboard end of each arm of the hub plate so as to sandwich the hub plate therebetween. Spacer-like portion 37 of each blade cuff member abuts one surface of the hub plate. Each pair of blade cuff members 12a forms a complete blade cuff and the pair of hub attachment members 11a forms a complete hub attachment means.

A first layer 38 of resin-impregnated filament rovings is wound through groove 37a of the blade cuff and through groove 21a of the attachment means. The winding of layer 38 is continuous around and adjacent to the side of hub plate 10 through the grooves in opposite blade cuffs and about opposite arms 39 and 40 of the rotor hub. At the same time or in a later operation, similar filament windings are wound adjacent to hub plate 10 to form a portion of the side of arms 41 and 42 of the rotor hub.

When the number of windings of the filament roving forming layer 38 is sufficient to substantially fill grooves 21a and 37a in both the attachment means and the blade cuffs, the winding operation is stopped and the roving is cut. The space over layer 38 between the ends of tongue 25 of the attachment means and tongue 33 of the blade cuff is substantially filled with a filler layer 43. The filler material may be any suitable material such as elastomer, but for the purpose of this embodiment of the invention it is preferred that the filler layer 43 consist of resin-impregnated aligned filament rovings.

Resin-impregnated filament rovings are then continuously wound over layer 43 to form layer 44 in groove 20a between portions 32 and 33 on the blade cuff. A filler layer 45 is then placed between the ends of tongue 24 of the attachment means and tongue 32 of the blade cuff. A layer of resin-impregnated filament rovings 46 is then continuously wound through groove 19a between portions 23 and 24 of the attachment means and in groove 35a between portions 28 and 29 of the blade cuff. Filler layer 47 is then placed between the ends of tongue 23 of the attachment means and tongue 31 of the blade cuff. A final layer of resin-impregnated filament rovings 48 is then continuously wound in groove 18a between portions 14 and 15 of the attachment means and in groove 34a between portions 27 and 28 of the blade cuff. A final layer of filler material 49 is placed on arms 41 and 42 between the ends of tongue 22 of the attachment means and portion 27 of the blade cuff.

Interlaminated layers of filament rovings and filler material are disposed on opposite sides of hub plate 10. Thus, the construction of the rotor hub is substantially symmetrical about the plane of the hub plate.

The filament roving forming the filament layers is preferably impregnated with a bonding thermosetting resin, such as an epoxy resin, before or during the winding operation. The thermosetting, resin-impregnated roving is cured by subjecting the structure to heat for a sufficient length of time to cure the resin. Thermosetting resins which are curable by other chemical or physical means such as radiation or curing catalysts, may be used if desired. As one example, the uncured structure may be heated to 250–300° F. for a period of about 4–6 hours to obtain a complete cure. The tempetaure and length of time necessary to obtain a complete cure is dependent upon the size of the rovings and the type of resin used. One example of a suitable resin-impregnated roving is glass filament roving, sold commercially by Owens Corning Company as "S901" roving and impregnated with resin commercially available from U.S. Polymeric Incorporated as "E787." Other rovings may be used and the choice depends upon the particular strength factor to be satisfied as well as other factors. As examples of other rovings, graphite yarns, boron fibers, beryllium wire, silicone carbide, aluminum boron silicate and beryllium glass filaments may be used.

The grooves between the sheet-like portions of both the hub attachment means 11 and blade cuff 12 serve as a mandrel for winding the filament rovings forming layers 38, 44, 46 and 48 of the arms. A filler material 50, such as an aluminum honeycomb, is disposed on both sides of hub plate 10 in the space between the filament rovings and filler layers. Filler material 50 may be placed in position before, during or after completion of the filament layer. If filler material 50 is placed in position before the winding of the filament layer, it may serve as an additional support base for those layers.

The filament rovings in the vicinity of blade cuff 12 are shown in FIG. 1 as lying substantially parallel to the axis of each rotor arm, and then flaring outwardly toward attachment means 11. The winding of filament rovings to obtain this shape may be accomplished in several ways. One convenient method is to simply wind the rovings through the grooves about the ends of the blade cuffs and through the corresponding grooves of the attachment means, and crimp or clamp the windings to the desired shape before and during cutting. Another convenient method is to wind the rovings into place using a roving follower guide so that each winding is laid into place according to the desired shape. When using this latter method, there should be little or no tension applied to the roving so that the roving will not slip out of place before curing.

The entire structure is then covered with skin layer 51. Skin layer 51 is formed by continuously wrapping filament rovings over each of arms 39–42, impregnating the rovings with suitable resins and curing the resin by suitable techniques.

After the curing of the resins forming the layers of the interlaminated rotor hub, the blade cuffs are machined with suitable cutting or grinding tools to remove the excess portion from the outboard end of each blade cuff to form face 52, and to form an aperture 43 which is adapted to receive blade bearings 54. It may occur that spacers 34–37 of the blade may be completely machined away, but since the structure is now completely cured, the spacers have served their purpose and may now be machined away.

In the use of the rotor hub illustrated in FIGS. 1–4, suitable rotor blades (not shown) are connected to a blade bearing 54. The blade bearing is slipped over the corresponding blade cuff so that the outside housing of the blade bearing surrounds the blade cuff. Tongue 54a of the blade bearing is inserted into aperture 53 of the blade cuff and the assembly is completed by fastening the tongue 54a to the rotor hub with suitable fasteners, such as bolts 90. These bolts pass through an arm of the rotor hub, a portion of the corresponding blade cuff, and mounting holes 91 on the tongues 54a of the blade bearing.

The rotor hub is mounted to a shaft such as the rotatable shaft of a helicopter motor by suitable mounting means (not shown) such as bolts. These bolts are passed through mounting holes 26 to the rotatable shaft. In this manner, attachment means 11 is mounted directly to the shaft of the helicopter. When subjected to strain forces and fatigue loads, the interlamination of alternate filament layers and filler layers provides sufficient flexing of each arm of the rotor hub in both the drag plane (the plane in which the arm lies and perpendicular to the axis of rotation) and the flapping plane (perpendicular to the drag plane and containing the axis of the arm). Hub plate 10 provides stiffness in both the drag and flapping planes and thereby provides in-plane stabilization of the arms of the rotor hub in both the drag and flapping planes.

The in-plane stabilization in the drag and flapping planes is further provided by the filler 50 which, together with the skin 51, substantially prevents flexing of the arm in the pitch plane (perpendicular to both the drag and flapping planes). Thus, the interlaminated layers of filament material permit sufficient flexing of the rotor hub in both the drag and flapping planes, which flexing is stabilized by the in-plane stiffness of the hub plate and filler 50. There is no need for drag and flap bearings, to permit this flexing, and the weight over prior rotor hubs is substantially reduced. Blade bearing 54 preferably includes a pitch bearing to permit the rotor blades to flex in the pitch plane.

In FIGS. 5–7 there is illustrated a modification of the rotor hub according to the present invention. The rotor hub comprises a pair of identical hub portions 60, 61 mounted together by suitable mounting means such as bolts (not shown). Each hub portion comprises a center hub plate 62, a hub attachment means 63 and a blade cuff 64.

Hub attachment means 63 is constructed in a similar manner as hub attachment mean 11 illustrated in FIGS. 1–3. It is constructed from a pair of identical hub attachment members 63a, shown in greater detail in FIG. 6. Member 63a is preferably a solid member and comprises a plurality of sheet-like portions 65–67 separated by washer-like portions (not shown) to form grooves 65a and 67a similar to member 11a shown in FIGS. 2 and 3. Each portion 65–67 has a plurality of tongues 68–70 each having successively increasing lengths and extending in the outboard direction along the sides of opposite arms of the rotor.

Blade cuff 64 is constructed in a similar manner as blade cuff 12 in FIGS. 1 and 4. It comprises a pair of identical blade cuff members 64a. Members 64a are preferably solid members and have a plurality of sheet-like portions 71–73 spaced apart by suitable washer-like portions (not shown) to form grooves 71a–73a. Portions 72 and 73 are provided with extending tongues 74 and 75 each of successively increasing length and each extending in the inboard direction along the sides of a hub arm. Members 63a and 64a may be conveniently formed by winding suitable steel rovings on a mandrel of suitable design (not shown). Alternatively, the members may be formed in a mold as hereinbefore described. The same high strength carbon steel rovings and bonding resin used for construction of members 11a and 12a in the embodiment of the rotor hub illustrated in FIGS. 1–4 may be used for construction of members 63a and 64a. Likewise, the resin may be cured in a similar manner as before described.

The construction of the rotor hub illustrated in FIG. 5 is completed by placing an attachment member 63a on opposite sides of hub plate 62 at the inboard portion of each arm 76 and 77. Likewise, a blade cuff member 64a is placed on opposite sides of the outboard end of each arm 76 and 77. Thus, each hub portion 60, 61 includes a hub plate sandwiched between a pair of attachment members and a pair of blade cuff members at the outboard end of each arm.

Portion 67 of the hub attachment member is spaced from hub plate 62 by a suitable washer-like portion (not shown), thereby forming groove 67a between portion 67 and hub plate 62. Likewise, a washer-like portion on each blade cuff member separates portion 73 from hub plate 62, thereby forming groove 73a between the hub plate and portion 73.

A first layer of resin-impregnated filament roving 78 is continuously wound through grooves 67a and 73a. Filament rovings forming layer 78 are continuously wound around both arms 76 and 77 of hub plate 62 to form the side of the hub portion 60. Upon completion of the layer 78, the winding of the filament rovings is stopped and the roving is cut.

A filler layer 79 is placed over the filament roving layer 78 and between the end of tongue 70 of hub attachment means and tongue 75 of the blade cuff. The filler layers in this embodiment are preferably constructed from a suitable elastomer, such as natural or synthetic rubber.

Filament rovings are then wound in groove 66c and in groove 72a and over the filler layer 79. These filament rovings are built up to form a layer 80 above the filler layer 79 and around the ends of opposite arms 76 and 77 of the rotor hub. Filler layer 81 is then placed over filament layer 80 and between the ends of tongues 69 of the hub attachment means and 74 of the blade cuff. Filament rovings are then wound in groove 71a of the blade cuff and in groove 65a of the hub attachment means to form layer 82. Like the embodiment illustrated in FIGS. 1–4, the grooves in the hub attachment means and blade cuff serve as a mandrel for winding filament rovings.

During the winding operation of the filament roving layers, the filament rovings are preferably pre-impregnated or impregnated during the winding operation with a suitable thermosetting or bonding resin. By way of example, the filament rovings forming the filament layers may be of the same type forming the filament layers in the embodiment illustrated in FIGS. 1–4, and the same or similar bonding resin may be utilized. After curing the resin, hub portions 60 and 61 may be machined to smoothness and provided with mounting holes 85 and 86 in the hub attachment means and blade cuffs, respectively.

Mounting holes 85 are provided for mounting the hub portions 60 and 61 together and to the rotor shaft, and mounting holes 86 are provided for mounting rotor blades 87 to the hub. Any suitable mounting or attachment means may be utilized for mounting the hub to the shaft and mounting the blades to the hub, such as bolts 88. When the rotor hub is attached to the rotor shaft, axis 101 of the hub is aligned with the axis of the rotor shaft.

It is preferred that no skin or center filler material be utilized over the arms in this embodiment so that sufficient flexing will be permitted in the pitch plane.

The rotor hub illustrated in FIGS. 5–7 provides flexibility of the arms of the rotor hub in the drag, flapping and pitch planes. The drag and flap bearings may be eliminated, due to the ability of the rotor hub to flex in both the drag and flap planes. Since an elastomer is utilized for the filler material between the various laminations of the filament rovings, the rotor hub illustrated in FIGS. 5–7 will also flex in the pitch plane, thereby eliminating the need for a pitch bearing. The layers of filament rovings act as shims between alternate layers of elastomer and thus prevent bulging of the elastomer layers under compression loads (along the axis of an arm). Center plate 62 is utilized to provide stability for the hub arms in their drag and flapping planes.

In some applications it may be desirable to provide a dihedral angle to the opposite arms of the rotor hub such as illustrated in FIG. 8. The dihedral angle, which may be as much at 5° for each arm, may be formed by constructing the rotor hub 89 in a flat plane and placing the hub in a jig prior to curing the resins in the filament rovings. The hub is then bent to the desired dihedral angle in the jig and the bonding resin is then cured. Upon removal of the rotor hub from the jig, the arms of the rotor hub will be permanently disposed in the desired dihedral angle.

The present invention thus provides a rotor hub having sufficient in-plane stability and capable of restricted flexure in the drag and flapping planes, thereby eliminating the need for the drag and flapping bearings hereinbefore utilized in conjunction with articulated helicopter rotors. Furthermore, in the modification illustrated in FIGS. 5–7, the rotor hub is capable of flexing in the pitch plane, thereby eliminating the need for a pitch bearing. The weight of the rotor hub is substantially reduced over rotor hubs hereinbefore known, without sacrificing strength, thus increasing the strength-to-weight ratio of the rotor hub and reducing the overall weight of the aircraft. The rotor hub is easily manufactured and has the same strength as rotor hubs heretofore known, yet only approximately 70% of the weight of the rotor hubs heretofore known.

This invention is not to be limited by the embodiment shown in the drawings and described in the description, which is given by way of example and not of limitation, but only in accordance with the scope of the appended claims.

What is claimed is:

1. An interlaminated rotor hub comprising: a hub plate having a plurality of extending arms; attachment means supporting the inboard ends of each arm of said hub plate, said attachment means having an axis, said attachment means being adapted to be attached to a rotatable shaft for rotation about said axis; a plurality of first grooves in said attachment means in planes substantially perpendicular to said axis, said first grooves lying in at least a portion of the vicinity of the side of said arms; a blade cuff mounted to the outboard end of each arm of said hub plate for supporting a rotor blade; a plurality of second grooves in each of said blade cuffs, each of said second grooves lying in a plane substantially parallel to the plane of the respective arms, said second grooves lying in at least a portion of the vicinity of the sides of said respective arms; and a layer of bonded continuously-wound filament rovings wound through a first groove in said attachment means and a corresponding second groove in said respective blade cuff, whereby a portion of the side of said rotor hub has alternate layers of filament rovings and attachment means and another portion of the side of said rotor hub has alternate layers of filament rovings and blade cuff.

2. An interlaminated rotor hub according to claim 1 wherein said first grooves are formed between adjacent first portions on said attachment means and said second grooves are formed between adjacent second portions on said blade cuffs, whereby alternate layers of filament rovings and attachment means portions are formed in the vicinity of the attachment means and alternate layers of filament rovings and blade cuff portions are formed in the vicinity of the blade cuffs.

3. An interlaminated rotor hub according to claim 2 further including extended tongues on at least some of the first and second portions, said tongues extending outboard in the direction of a blade cuff.

4. An interlaminated rotor hub according to claim 3 further including a layer of first filler means between each layer of filament rovings and between the ends of corresponding extended tongues of each of the first and second portions, whereby a portion of the side of said rotor hub has alternate layers of filament rovings and first filler means.

5. An interlaminated rotor hub according to claim 4 wherein at least some of the layers of first filler means comprise an elastomer.

6. An interlaminated rotor hub according to claim 4 wherein the first filler means comprises bonded filament rovings.

7. An interlaminated rotor hub according to claim 4 wherein the blade cuff and attachment means are formed from bonded steel rovings and the filament rovings are glass rovings.

8. An interlaminated rotor hub according to claim 4 wherein each of said layers of filament rovings and first filler means is adjacent the side of the hub plate.

9. An interlaminated rotor hub according to claim 8 wherein at least some of the layers of first filler means comprise an elastomer.

10. An interlaminated rotor hub according to claim 8 wherein the blade cuff and attachment means are formed from bonded steel rovings, the filament rovings are glass rovings, and at least some of the layers of first filler means comprise an elastomer.

11. An interlaminated rotor hub according to claim 8 wherein the first filler means comprises bonded filament rovings.

12. An interlaminated rotor hub according to claim 11 further including second filler means adjacent the hub plate and between opposite portions of the filament rovings forming the periphery of the rotor hub, and a skin covering the second filler means and side layers.

13. An interlaminated rotor hub according to claim 12 wherein the skin is formed of bonded filament rovings.

14. An interlaminated rotor hub according to claim 13 wherein the blade cuff and attachment means are formed from bonded steel rovings, the filament rovings are glass rovings, the first filler means comprises filament glass rovings, and the second filler means is a honeycomb filler.

15. An interlaminated rotor hub comprising: attachment means capable of being rotated about an axis; a hub plate mounted to said attachment means and having a plurality of arms extending substantially perpendicular to said axis; a blade cuff supported by said hub plate at the outboard end of each extending arm, each blade cuff being adapted to support a rotor blade; and a plurality of bonded continuously-wound filament roving layers supported by said attachment means and said blade cuffs, said layers of filament rovings lying in the vicinity of the sides of said arms and disposed in a plane substantially parallel to the plane defined by said arms.

16. An interlaminated rotor hub according to claim 15 further including a layer of filler means disposed between portions of adjacent layers of filament rovings, thereby forming a portion of a periphery of said rotor hub comprising alternate layers of filler means nad filament rovings.

17. An interlaminated rotor hub according to claim 16 wherein at least some of the layers of filler means comprises an elastomer.

18. An interlaminated rotor hub according to claim 16 wherein the filler means comprises bonded filament rovings.

19. An interlaminated rotor hub according to claim 15 wherein a plurality of first grooves are disposed in a portion of the periphery of said attachment means and a plurality of second grooves are disposed in a portion of the periphery of each of said blade cuffs, each of said first and second grooves being disposed in a plane substantially parallel to said arms, each of said continuously-wound filament layers being disposed in one of said first grooves and a corresponding one of said second grooves.

20. An interlaminated rotor hub according to claim 19 further including a layer of filler means disposed between portions of adjacent layers of filament rovings, thereby forming a portion of a periphery of said rotor hub comprising alternate layers of filler means and filament rovings.

References Cited

UNITED STATES PATENTS

| 3,228,479 | 1/1966 | Nagler | 170—160.53 X |
| 3,228,481 | 1/1966 | Eldred | 170—160.53 X |

FOREIGN PATENTS

| 1,334,446 | 7/1963 | France. |

EVERETTE A. POWELL, JR., *Primary Examiner.*